(12) United States Patent
Dickens et al.

(10) Patent No.: US 8,230,255 B2
(45) Date of Patent: Jul. 24, 2012

(54) BLOCKING WRITE ACCES TO MEMORY MODULES OF A SOLID STATE DRIVE

(75) Inventors: Louie Arthur Dickens, Tucson, AZ (US); Timothy A. Johnson, Tucson, AZ (US); Craig Anthony Klein, Redington Beach, FL (US); Gregg Steven Lucas, Tucson, AZ (US); Daniel James Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 27 days.

(21) Appl. No.: 12/638,363

(22) Filed: Dec. 15, 2009

(65) Prior Publication Data

US 2011/0145633 A1 Jun. 16, 2011

(51) Int. Cl.
*G06F 11/00* (2006.01)
*G06F 11/07* (2006.01)

(52) U.S. Cl. ......... 714/6.13; 714/6.1; 714/6.11; 714/42; 365/225.7

(58) Field of Classification Search ................ 714/5, 39, 714/42, 47, 718, 723, 6.1, 6.11, 6.13, 6.2, 714/6.3; 365/225.7
See application file for complete search history.

(56) References Cited

U.S. PATENT DOCUMENTS

| | | | | |
|---|---|---|---|---|
| 5,644,539 A | * | 7/1997 | Yamagami et al. | 365/200 |
| 5,764,880 A | * | 6/1998 | Gerdt et al. | 714/6.32 |
| 6,487,623 B1 | * | 11/2002 | Emerson et al. | 710/302 |
| 7,035,158 B2 | * | 4/2006 | Kozuka | 365/225.7 |
| 7,400,467 B1 | | 7/2008 | Calihan et al. | 360/77.02 |
| 7,954,021 B2 | | 5/2011 | Lucas et al. | |
| 2004/0073829 A1 | * | 4/2004 | Olarig | 714/6 |
| 2008/0288814 A1 | | 11/2008 | Kitahara | |
| 2009/0037767 A1 | | 2/2009 | Shiota et al. | |
| 2009/0040650 A1 | | 2/2009 | Bates et al. | |
| 2009/0249140 A1 | * | 10/2009 | Yeh et al. | 714/723 |
| 2010/0125751 A1 | * | 5/2010 | McKean | 714/5 |
| 2010/0306577 A1 | * | 12/2010 | Dreifus et al. | 714/6 |
| 2010/0306580 A1 | * | 12/2010 | McKean et al. | 714/8 |
| 2011/0099320 A1 | | 4/2011 | Lucas et al. | |

FOREIGN PATENT DOCUMENTS

| | | |
|---|---|---|
| EP | 0 806 726 A1 | 11/1997 |
| JP | 2308477 | 12/1990 |
| JP | 63026802 | 4/1998 |
| JP | 2002050135 | 2/2002 |

(Continued)

OTHER PUBLICATIONS

G.S.Lucas, G. Tressler, D.J. Vanstee, A. Walls; 'Solid State Drive with Flash Sparing'. IBM Corporation; U.S. Appl. No. 12/604,614, filed Oct. 23, 2009; pp. 1-18 (includes 3 Pgs. of Figures).

(Continued)

*Primary Examiner* — Joseph Schell

(57) ABSTRACT

Described are embodiments of an invention for blocking write access to memory modules of a solid state drive. The solid state drive includes a controller access module or a memory access module that controls write access to the solid state drive and the memory modules of the solid state drive. Upon determining that a memory module has failed, the failed memory module or the entire solid state memory device is configured to be read only to prevent an errant write of data over critical data. Further, a failed memory module, or solid state device memory having a failed memory module, may be replaced upon failure.

22 Claims, 4 Drawing Sheets

FOREIGN PATENT DOCUMENTS

JP 2006139339 6/2006

OTHER PUBLICATIONS

G.S.Lucas, G. Tressler, D.J. Vanstee; 'Solid State Drive with Adjustable Drive Life and Capacity'. IBM Corporation; U.S. Appl. No. 12/604,616, filed Oct. 23, 2009; pp. 1-22 (includes 4 Pgs. of Figures).

"Memory Error Detection Using Light-Weight Software Approach", Author: IBM, Source: www.ip.com, Date: Aug. 16, 2005, IP.com No. IPCOM000126967D.

* cited by examiner

BLOCKING WRITE ACCES TO MEMORY MODULES OF A SOLID STATE DRIVE

TECHNICAL FIELD

The invention relates generally to the field of solid state drives (SSDs).

BACKGROUND

A solid state drive (SSD) is a data storage device that utilizes solid state memory, such as flash memory, to store data. SSDs are increasingly being used in computing systems due to their high performance and low incidence of mechanical reliability issues. Despite the low incidence of mechanical reliability issues, SSDs still fail because the flash devices that comprise the SSD support only a limited number of program/erase (P/E) cycles. Further, the flash devices are susceptible to temperature effects, electrostatic discharge (ESD), radiation, and prolonged exposure to high voltages. In addition, contacts connecting the controller to the flash devices may corrode and wear out over time.

SUMMARY OF THE INVENTION

Described are embodiments of an invention for blocking write access to memory modules of a solid state drive. The solid state drive includes a controller access module or a memory access module that controls write access to the solid state drive and the memory modules of the solid state drive. Upon determining that a memory module has failed, the failed memory module or the entire solid state memory device is configured to be read only to prevent an errant write of data over critical data. Further, a failed memory module, or solid state device memory having a failed memory module, may be replaced upon failure.

For example, an embodiment of a method of the present invention includes determining a failure of at least one memory module of a solid state memory device. The solid state memory device has at least one memory module. The method also configures at least a portion of the solid state memory module of the solid state memory device to be read-only in response to determining a failure of at least one memory module.

In yet another embodiment, the method detects a number of data access errors for each memory module of a solid state memory device. The solid state memory device has at least one memory module. The method further determines if a data access error threshold for at least one memory module has been reached and configures at least a portion of the solid state memory device to be read-only in response to determining the data access error threshold has been reached. Still further, the method performs a solid state memory reconstruction process in response to configuring at least a portion of the solid state memory device to be read-only.

In an embodiment of memory system, the system includes a solid state drive controller coupled to a solid state memory device. The solid state controller determines a failure of at least one memory module of a solid state memory device. The solid state memory device has at least one memory module. The solid state drive controller configures at least a portion of the solid state memory device to be read-only in response to determining a failure of at least one memory module of the solid state memory device.

In another embodiment of a memory system, the system includes a solid state drive controller coupled to a solid state memory device. The solid state controller detects a number of data access errors for each memory module of the solid state memory module. Further the solid state drive controller determines if a data access error threshold for at least one memory module has been reached and configures at least a portion of the solid state memory device to be read-only in response to determining the data access error threshold has been reached. Further, the solid state drive controller performs a solid state memory device reconstruction process in response to the configuration of at least a portion of the solid state memory device to be read-only.

DETAILED DESCRIPTION OF THE PREFERRED EMBODIMENT

Memory arrays of solid state devices are increasingly being used as the main working storage repository for a data processing system. Ensuring the integrity of data processed by the data processing system is critical for the reliable operation of such a system. It is known that solid state memory devices are susceptible to degradation with an increase in the number of program/erase cycles (cycles of writing and rewriting). While the degradation may simply result in the generation of errors that are correctable without the loss of data, in other instances, the repetitive read and write attempts may lead to higher error rates, potentially resulting in the loss of critical data. Therefore, there is an ongoing need preventing a loss of data on a solid state memory device.

The embodiments discussed herein prevent the loss of data by determining if a memory module has failed and configuring the failed memory module or a solid state memory device having a failed memory module as read only to prevent an errant write of data over critical data. Further, a failed memory module, or solid state device memory having a failed memory module, may be replaced upon failure.

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
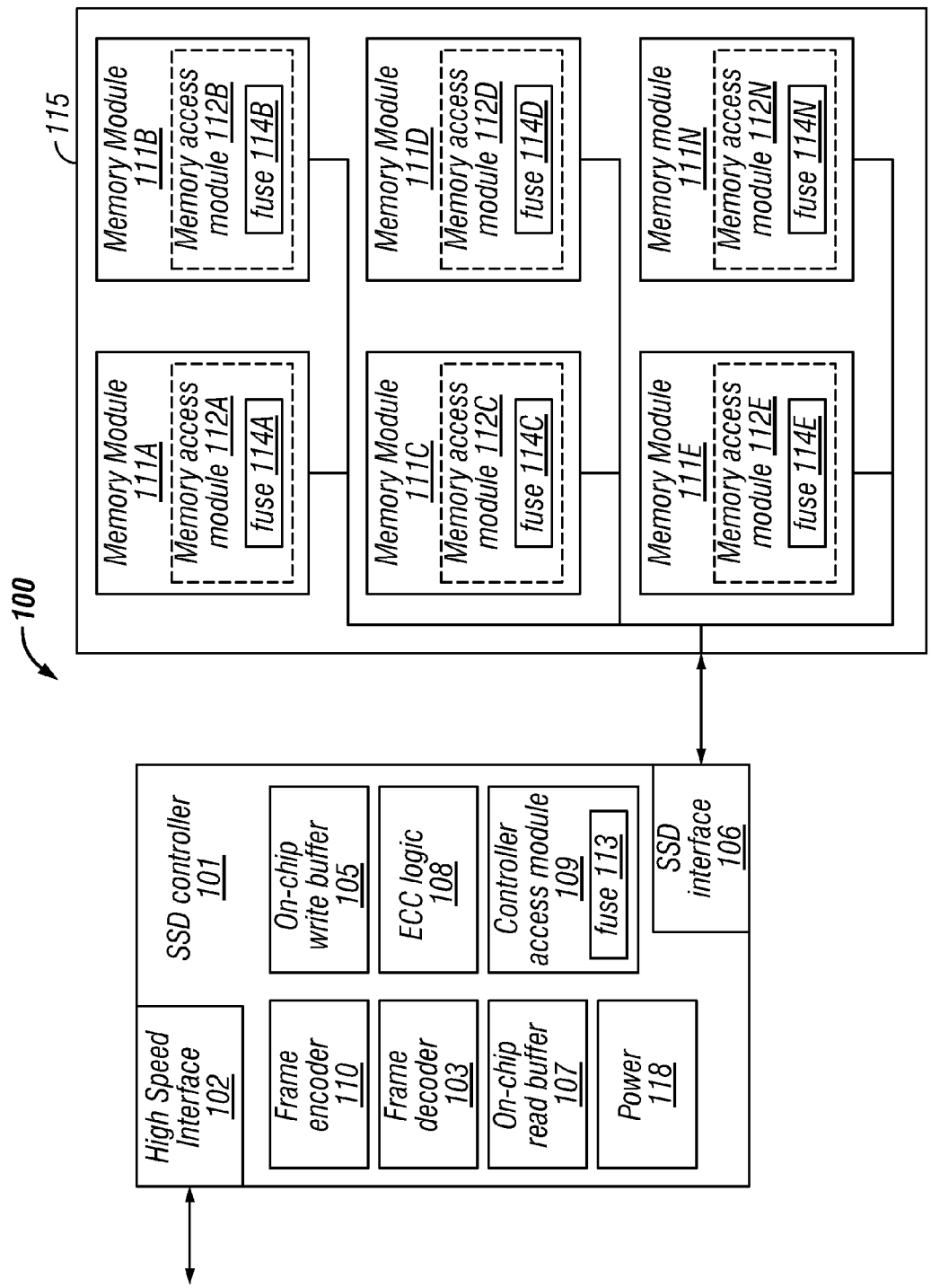
FIG. 1 illustrates a solid state drive in accordance with an embodiment of the invention.

Turning to the figures, FIG. 1 illustrates a solid state drive (SSD) 100. SSD 100 comprises SSD controller 101 and a solid state memory device 115. Solid state memory device 115 has memory modules 111A-111N. Memory modules 111A-111N may be NAND flash memory, Dual In-Line Memory Modules (DIMM), or electrically-eraseable read-only memory (EEPROM). Memory modules 111A-111N have a plurality of pins (not shown). One of ordinary skill in the art would understand that the pins include, without limitation, a write enable pin, a write input pin, power supply voltage pins, ground voltage pins, a chip enable pin, a read enable pin, etc.

SSD controller 101 communicates with a computing system such as computing system 400 (FIG. 4) via high speed interface 102. High speed interface 102 may comprise Serial Advanced Technology Attachment (SATA), Parallel Advanced Technology Attachment (PATA), Integrated Drive Electronics (IDE), Small Computer System Interface (SCSI), Internet Small Computer System Interface (iSCSI), Serial Attached Small Computer System Interface (SAS), Peripheral Component Interconnect Express (PCIe), Fibre Channel (FC), Ethernet, Fibre-Channel over Ethernet (FCoE), Infiniband, Universal Serial Bus (USB), or any other appropriate type of transmit and receive ports. The computing system is a device that sends a data write request and/or a data read request to the SSD 100. The computing system may comprise any computing device known in the art, such as a mainframe, server, personal computer, workstation, laptop, handheld computer, telephony device, network appliance, virtualization device, storage controller, etc. For example, in an embodiment where the SSD 100 is used as a data storage device that replaces a hard disk drive (HDD), a RAID controller that sends a data write request and/or a data read request to the HDD may be the computing system.

Data to be written onto the SSD 100 is received on high speed interface 102, and is sent to on-chip write buffer 105 via frame decoder 103. From on-chip write buffer 105, the write data is written into the appropriate memory module 111A-111N via SSD interface 106. Once the data is written into the appropriate memory module 111A-111N the error checking and correction (ECC) logic 108 performs write verification.

A write verification is performed by reading the data stored to the memory modules 111A-111N to determine if the data has been accurately stored. In one embodiment, the SSD controller has a controller access module 109. In this embodiment, error checking and correction (ECC) logic 108 performs error correction functions, on data written and read by controller access module 109, using known techniques, and sends information regarding the number of data access errors, such as write verification errors, detected during the write verification of freshly written data.

If the number of data access errors exceeds a hard-fail error-threshold, the data is uncorrectable by the ECC and the write verification is considered a hard-failure. The term hard-failure, herein, refers to an unrecoverable-failure. However, if the number of data access errors does not exceed the hard-fail error threshold, but does exceed a write-error-threshold, the write verification is still considered a failure because some allowance for additional read errors must be given in order to ensure that the data is readable in the future. It should be noted that the write-error-threshold is numerically less than the hard-fail error-threshold. Further, the write-error-threshold may be defined by an administrator, a user, or, alternatively, the manufacturer of the SSD 100. For example, the user may define the write-error-threshold based on the criticality of the data stored in the SSD 110. In the case where the number of data access errors exceeds a write-error-threshold, data in on-chip write buffer 105 is not erased, and a write-retry is done, either to the same memory module 111A-111N or a different memory module 111A-111N. Such write verification failures indicate that the memory module 111A-111N is no longer capable of supporting future write operations and should be blocked from future write operations and replaced if an available memory module exists. An available memory module is a memory module that has not failed and has enough storage space available to hold the data that is to be written and stored.

Command scheduler 104 receives commands from the computing system 400 (FIG. 4) via frame decoder 103, and controls on-chip write buffer 105, SSD interface 106, on-chip read buffer 107, and frame encoder 110. Data in on-chip write buffer 105 is erased and replaced by new data to be written after the write verification process is completed successfully.

For SSD read operations, data is read out of the appropriate memory module 111A-111N via SSD interface 106, and the read out data is sent to on-chip read buffer 107, then to high speed interface 102 via error checking and correction (ECC) logic 108 and frame encoder 110. In one embodiment, error checking and correction (ECC) logic 108 performs error correction functions using known techniques, and sends information regarding the number of data access errors, such as read errors, to the controller access module 109.

If the number of data access errors exceeds the hard-fail error-threshold, the data is uncorrectable by the ECC and the read is a hard-failure. Accordingly, the customer data is lost unless a mirrored copy is available or the data is in a parity RAID and the errant data can be reconstructed via XOR (exclusive-OR) arithmetic. However, if the number of data access errors does not exceed the hard-fail error-threshold, but does exceed a read-error-threshold, the read is still considered a failure because some allowance for additional read errors must be given in order to ensure the data is readable in the future. In one embodiment the read-error-threshold is numerically greater-than or equal-to the write-error-threshold and numerically less than the hard-fail error-threshold. Further, the read-error-threshold may be defined by an administrator, a user, or, alternatively, the manufacturer of the SSD 100. For example, the user may define the read-error-threshold based on the criticality of the data stored in the SSD 110. Such read failures indicate that the memory module 111 is no longer capable of supporting future write operations and should be blocked from future write operations and replaced if an available memory module exists. Data in on-chip read buffer 107 is sent to the user or user-application after the all errors are ECC-corrected by ECC logic 108 and when there are no hard failures in the data.

A memory module 111A-111N is said to have failed when the detected data access errors (write verification errors and read errors) are greater than the data access error threshold. In one embodiment, the data access error threshold may be defined by one or more of the write-error-threshold, read-error-threshold, and hard-fail error-threshold. For example, the data access error threshold is defined to be less than the hard-fail error-threshold and equal to, or greater than, the write-error threshold or the read-error threshold. This data access error threshold may be defined by an administrator, a user, or, alternatively, the manufacturer of the SSD 100. For example, the user may define the data access error threshold based on the criticality of the data stored in the SSD 110.

In one embodiment, controller access module 109 controls write access to the memory modules 111A-111N based on the detected data access errors (e.g. write verification errors and read errors) at each memory module 111A-111N during data access (e.g. a write verification process or a data reading process). Specifically, controller access module 109 blocks write access to the failed memory module 111A-111N, such that the failed memory module 111A-111N, is read-only, upon determining that the data access errors are greater than a data access error threshold.

Further, in one embodiment, the controller access module 109 configures the failed memory module 111A-111N to be read-only logically. The controller access module 109 controls power 118 to write pin of the memory module 111A-111N. Power 118 puts a positive voltage to write pin to enable writing. Controller access module 109 configures the failed memory module 111A-111N to be read-only by selectively blocking power 118 to the memory module 111A-111N. Because the write access is blocked logically by the controller access module 109, the process may be reversed. For example, memory module 111A-111N is made write accessible again by putting a positive voltage to write pin of memory module 111A-111N.

In another embodiment, the controller access module 109 contains a fuse 113. Further, in one embodiment, the controller access module 109 is a programmable read-only memory (PROM) and contains a fuse 113. Fuse 113 is coupled to write pin of memory module 111A-111N. In this embodiment, the controller access module 109 of the SSD controller 101 configures the failed memory module 111A-111N to be read-only physically. For example, controller access module 109 controls power 118 to permanently burn fuse 114, opening the write-circuit, and thus permanently blocking write access to the failed memory module(s) 111A-111N.

Alternatively, rather than having a controller access module 109 in SSD 100, each memory module 111A-111N may have a memory access module 112A-112N, respectively. The memory access modules 112A-112N control write access to each respective memory module 111A-111N based on the detected data access errors (e.g. write verification errors and read errors). Specifically, the memory access modules 112A-112N block write access to the failed memory module(s) 111A-111N, respectively, such that the failed memory module 111A-111N is read-only, upon determining that the data access errors are greater than a data access error threshold.

For example, memory access module 112A blocks write access to memory module 111A, making memory module 111A read-only. In one embodiment, the memory access modules 112A-112N each contain a fuse 114A-114N. Still further, in one embodiment, the memory access modules 112A-112N are programmable read-only memories (PROMs), and each memory access module 112A-112N contains a fuse 114A-114N. Fuse 114A-114N is coupled to write pin of memory module 111A-111N. In this embodiment, the SSD controller 101 controls power 118 to permanently burn fuse 114A-114N, opening the write-circuit, and thus permanently blocking write access to the failed memory module(s) 111A-111N. For example, a fuse 114A within memory access module 112A blocks access to memory module 111A, making memory module 111A read-only.

One of ordinary skill in the art would understand that alternatively the memory modules 111A-111N could be configured to be read-only by blocking power to a write permit pin, a write input pin, a write protect pin or other pin that controls writing to a memory module 111A-111N.

For simplicity of discussion, and so as to not obscure the invention, only a single failed memory module 111A-111N is described herein. One of ordinary skill in the art would recognize that the description herein applies to one or more failed memory modules.

It should be understood by one of ordinary skill in the art that memory modules 111A-111N are shown for illustrative purposes only. SSD 100 may comprise any appropriate number of memory modules. In one embodiment SSD interface 106 comprises a plurality of flash ports in communication with N flash busses. Each of the N flash busses may connect to multiple memory modules 111A-111N through the use of independent chip selects and on chip addressing. The N flash busses may comprise 64 bit busses in some embodiments. When a write or a read occurs, all N busses may be accessed. When a write occurs, N devices may be written with an ECC code from ECC logic 108 that corrects for an M bit symbol with the symbol size equal to the memory module bus width.

In one embodiment, when a write occurs the data may be striped across N devices by known data striping techniques. Data striping is the technique of segmenting logically sequential data and assigning the segments to multiple physical devices. In some configurations (such as a RAID-5 with a parity drive), if one memory module fails, the data may be restored by using other memory modules in the array and XOR arithmetic. In another embodiment, when a write occurs the data may be mirrored onto another memory module. A mirror copy is a replication of a logical volume onto another memory module to ensure continuous availability. A mirror copy is a substantially exact copy of the data. It should be understood by one of ordinary skill in the art that any known method may be used to store the data to memory modules 111A-111N.

Figure 2:
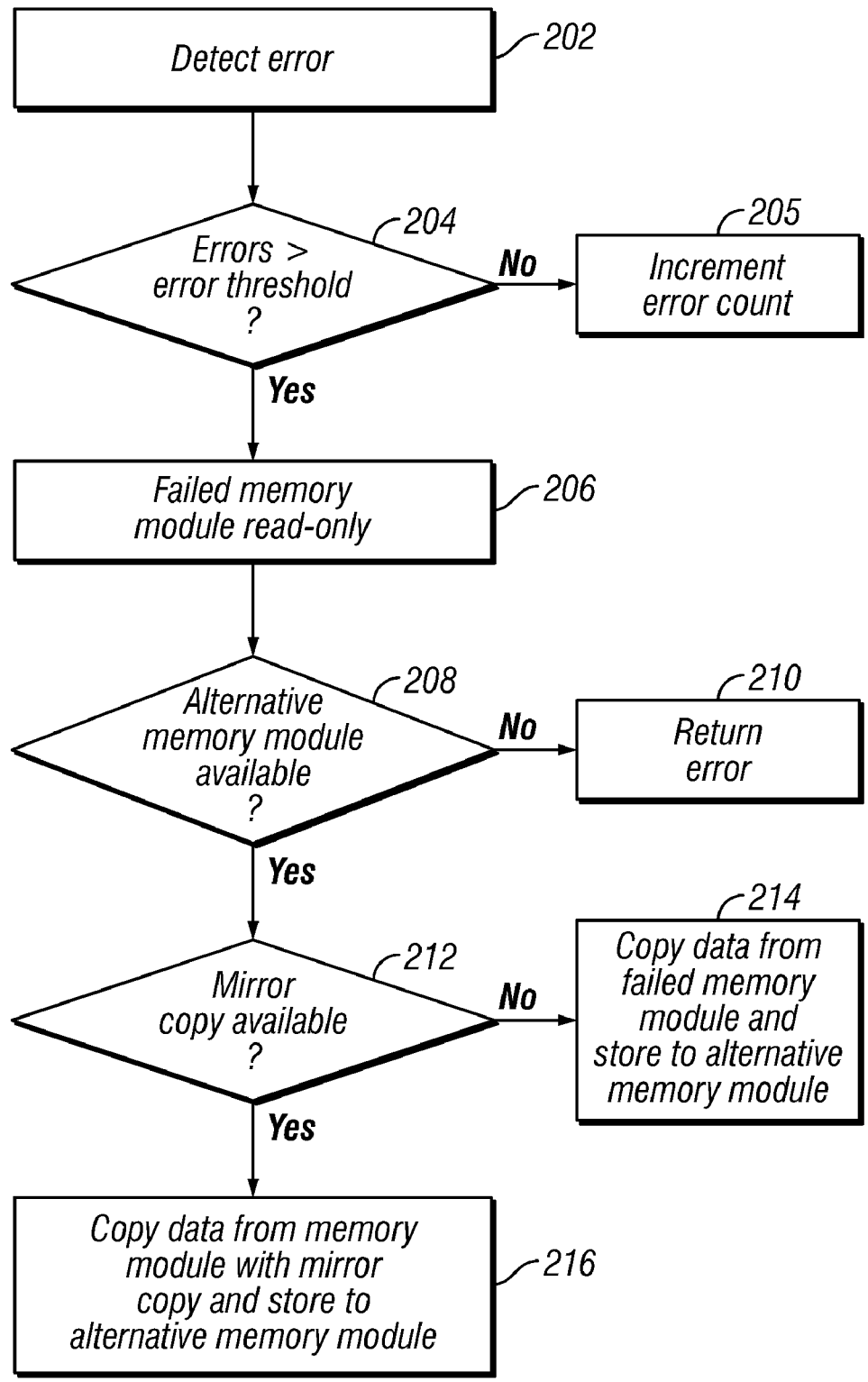
FIG. 2 illustrates a flowchart of a method of configuring a least a portion of a solid state drive to be read-only in accordance with an embodiment of the invention.

FIG. 2 illustrates an embodiment of the present invention wherein data is not striped across memory modules 111A-111N. In step 202, the SSD controller 101 detects a data access error. The data access error may be a write verification error or a data read error. In step 204, the ECC logic 108 determines if the number of data access errors encountered during a data access event (e.g. a data read or write event) are greater than a data access error threshold. A memory module 111A-111N is said to have failed when the detected data access errors are greater than the data access error threshold. The data access error threshold may be defined by an administrator, a user, or, alternatively, it may be set by the manufacturer of the SSD 100.

If the detected data access errors are less than the data access error threshold then, in step 205, the controller access module 109 increments a data access error count for the memory module 111A-111N that is the source of the error. The data access error count may be stored in an error map table. An embodiment of an error table map is shown in Table 1 below. Alternatively, if the detected data access errors are less than the data access error threshold then, in step in step 205, the memory access module 112A-112N of the memory module 111A-111N associated with the error increments a data access error count.

TABLE 1

| Memory Module | Error Count | Error threshold |
|---|---|---|
| 112A | 1 | 2 |
| 112B | 3 | 2 |
| 112N | 2 | 3 |

In step 206, if the detected data access errors are greater than the data access error threshold for at least one memory module 111A-111N, the failed memory module 111A-111N is configured to be read-only, such that the failed memory module 111A-111N cannot be written to. For example, if memory module 112B has a data access error threshold of 2 data access errors, and the ECC logic 108 detects 3 data access errors, memory module 112B has failed, and is configured to be read-only. As discussed above, in one embodiment the controller access module 109 configures the memory module 111A-111N to be read-only. In another embodiment, the memory access module 112A-112N associated with the failed memory module 111A-111N configures the failed memory module 111A-111N to be read-only. In one embodiment, controller access module 109 logically configures the failed memory module 111A-111N to be read-only by selectively blocking power 118 to the memory module 111A-111N. In another embodiment, controller access module 109 physically configures the failed memory module 111A-111N to be read-only by burning a fuse 114, permanently blocking write access to the memory module 111A-111N. Still further, in another embodiment, memory access module 112A-112N physically configures the failed memory module 111A-111N to be read-only. For example, burning fuse 114A-114N within memory access module 112A-112N blocks access to memory module 111A-111N, making memory module 111A-111N permanently read-only.

In step 208, the SSD controller 101 determines if there are alternative memory modules 111A-111N available for a write process. An available memory module is a memory module that has not failed and has enough storage space available to hold the data that is to be written and stored. If no alternative memory modules are available for writing then in step 210 the SSD controller 101 returns an error message. In one embodiment the error message indicates that a new SSD is needed. In one embodiment, the error message may be displayed on a graphical user interface (GUI). One of ordinary skill in the art would understand that the error message may be communicated by other means, even nonconventional, such as facebook, twitter, or blogs.

If an alternative memory module 111A-111N is available the process flows to step 212. In step 212 the SSD controller 101 determines if data on the failed memory module has a mirror copy available on another memory module 111A-111N. As discussed above, a mirror copy is a replication of a logical volume onto another memory module. The mirror copy is substantially an exact copy of the data. In step 216, if a mirror copy of the data is available on another memory module 111A-111N, then the SSD controller 101 copies data from the memory module 111A-111N with the mirror copy and stores the data to the alternative memory module 111A-111N. For example, if memory module 111A has failed and a mirror copy was stored on memory module 111B, then the mirror copy on memory module 111B is copied and stored to an alternative memory module 111A-111N. In step 214, if no mirror copy of the data is available on another memory module 111A-111N, the SSD controller 101 copies the data on the failed memory module 111A-111N and stores the data to the alternative memory module. It should be understood by one of ordinary skill in the art that a mirror copy may be stored on more than one memory module 111A-111N.

Figure 3:
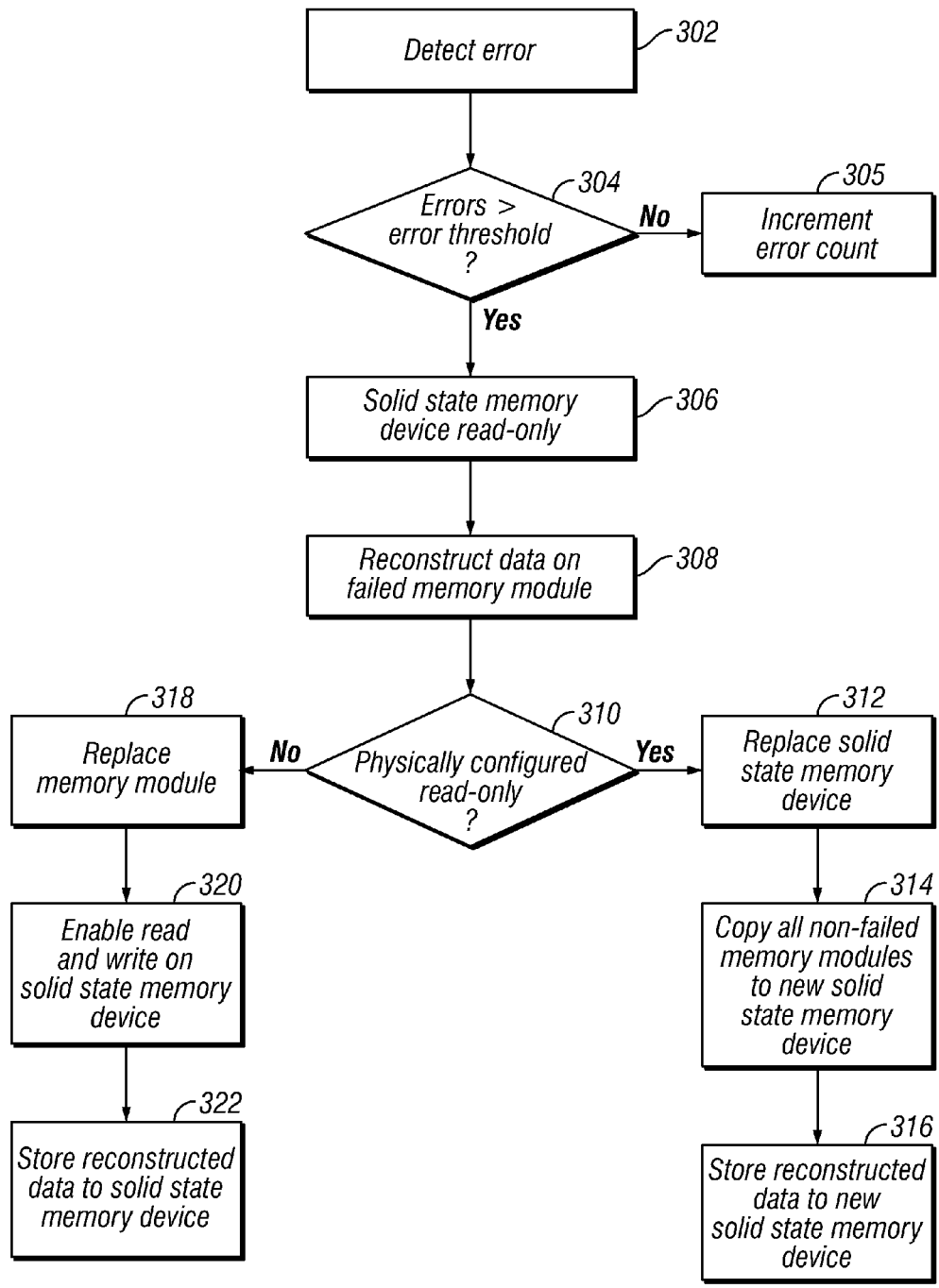
FIG. 3 illustrates a flowchart of a method of configuring a least a portion of a solid state drive to be read-only in accordance with another embodiment of the invention.

FIG. 3 illustrates an embodiment of the present invention wherein data is striped across memory modules 111A-111N. In step 302, the SSD controller 101 detects a data access error. The data access error may be a write verification error or a data read error. In step 304, the ECC logic 108 determines if the number of data access errors encountered during a data access event (e.g. a data read or write event) are greater than a data access error threshold. The data access error threshold may be defined by an administrator, a user, or, alternatively, it may be set by the manufacturer of the SSD 100.

If the detected data access errors are less than the data access error threshold then, in step 305, the controller access module 109 increments a data access error count for the memory module 111A-111N that is the source of the error. The data access error count may be stored in an error map table as discussed above. Alternatively, if the detected data access errors are less than the data access error threshold then, in step in step 305, the memory access module 112A-112N of the memory module 111A-111N associated with the error increments a data access error count.

In step 306, if the detected data access errors are greater than the data access error threshold for at least one memory module 111A-111N, the entire solid state memory device 115 is configured to be read-only such that none of the memory modules 111A-111N within the solid state memory device 115 can be written to. For example, if memory module 112B has a data access error threshold of 2 data access errors and the ECC logic 108 detects 3 data access errors, the entire solid state memory device 115 is configured to be read-only. In one embodiment the controller access module 109 configures the solid state memory device 115 to be read-only. In another embodiment, the memory access modules 112A-112N of memory modules 111A-111N configures each and every memory module 111A-111N to be read-only, such that the entire solid state memory device 115 is read-only.

Further, the solid state memory device 115 and memory modules 111A-111N may be configured to be read-only logically or physically. For example, the solid state memory device 115 is be configured to be read-only by blocking power 118 to memory modules 111A-111N. In another embodiment, the solid state memory device 115 is physically configured to be read-only by burning fuse 113 within the controller access module 109, thus, permanently making the solid state memory device 115 read-only. Alternatively, the entire solid state memory device 115 is physically configured to be read-only by burning fuses 114A-114N within the memory access modules 112A-112N of each and every memory module 111A-111N of the solid state memory device 115, permanently making the solid state memory device 115 read-only.

Once the solid state memory device 115 is made read-only the data reconstruction process begins. In step 308, in step the ECC logic reconstructs the data that was on the failed memory module 111A-111N using known ECC techniques. For example, the ECC logic 108 may be configured to perform a ECC algorithm utilizing parity exclusive-or (XOR) techniques to reconstruct the data, as known in the art.

In step 310 the ECC logic 108 determines if the solid state memory device 115 or the memory modules 111A-111N are physically configured to be read-only. As explained above, the solid state memory device 115 may be physically or logically configured to be read-only. The solid state memory device 115 may be physically configured to be read-only by burning a fuse, thus making solid state memory device 115 read-only permanently. If it is determined that the solid state memory device 115 was physically configured to be read-only then the process proceeds to step 312. In step 312, solid state memory device 115 is replaced with a new solid state memory device 115. In step 314, ECC logic 108 copies the data on all memory modules 111A-111N that have not failed and stores the data to the new solid state memory device 115. In step 316, the data that was reconstructed in step 308 is saved to the new solid state memory device 115.

Returning to step 310, if it is determined that the solid state memory device 115 was not physically configured to be read-only then the process proceeds to step 318. In step 318, the failed memory module 111A-111N is replaced with a new memory module 111A-111N. In another embodiment, in which more than one memory module 111A-111N has failed, all failed memory modules 111A-111N are replaced. In step 320, the solid state memory device 115 is made read and write enabled.

As discussed above, the controller access module 109 configures the failed memory module 111A-111N to be read-only logically by blocking power 118 to the memory module. Because the write access is blocked logically by the controller access module 109, the process may be reversed. For example, memory module 111A-111N is made write accessible again by putting a positive voltage to write pin of memory module 111A-111N. In step 322, the data that is reconstructed in step 308 is stored in solid state memory device 115.

It should be noted that one or more memory modules 111A-111N may fail. Those skilled in the art would recognize that the method and system discussed herein would be applicable to more than one failed memory module.

It will be noted that the variable identifier "N" is used in several instances in FIG. 1 to more simply designate the final element (e.g., memory modules 111A-111N, memory access modules 112A-112N and fuses 114A-114N) of a series of related or similar elements (e.g., memory modules, memory access modules, and fuses). The repeated use of such variable identifiers is not meant to imply a correlation between the sizes of such series of elements, although such correlation may exist. The use of such variable identifiers does not require that each series of elements has the same number of elements as another series delimited by the same variable identifier. Rather, in each instance of use, the variable identified by "N" may hold the same or a different value than other instances of the same variable identifier.

Figure 4:
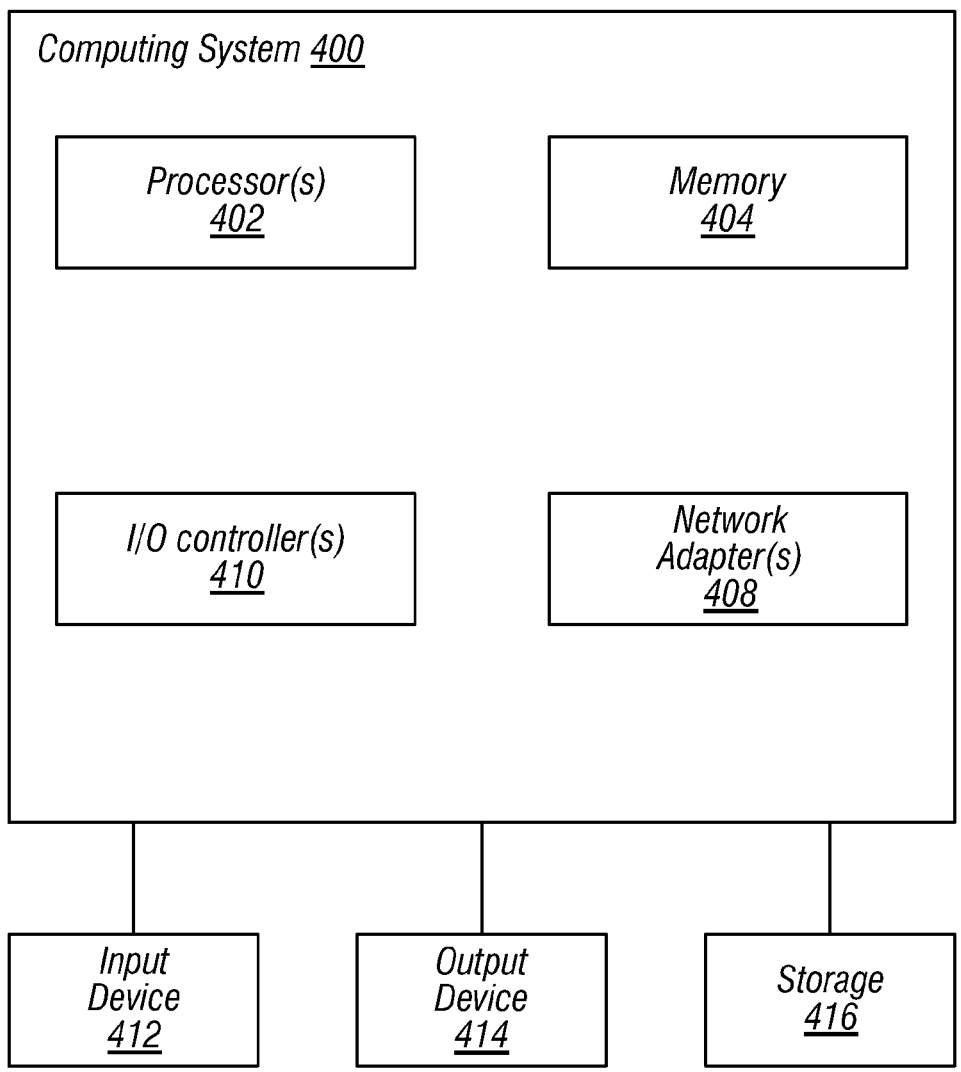
FIG. 4 illustrates a computing system that may be used in accordance with certain embodiments.

FIG. 4 illustrates a computing system 400 that may be used in accordance with certain embodiments. The computing system 400 is suitable for storing and/or executing program code and includes at least one processor 402 coupled directly or indirectly to memory elements 404 through a system bus (not shown). The memory elements 404 may include local memory employed during actual execution of the program code, bulk storage, and cache memories which provide temporary storage of at least some program code in order to reduce the number of times code must be retrieved from bulk storage during execution. The memory elements 404 include an operating system and one or more computer programs (not shown).

Input/Output (I/O) devices 412, 414 (including but not limited to keyboards, displays, pointing devices, etc.) may be coupled to the system either directly or through intervening I/O controllers 410.

Network adapters 408 may also be coupled to the system to enable the data processing system to become coupled to other data processing systems or remote printers or storage devices through intervening private or public networks. Modems, cable modem and Ethernet cards are just a few of the currently available types of network adapters 408.

The computing system 400 may be coupled to storage 416 (e.g., solid state drive 100 as shown in FIG. 1, in addition it may be coupled to a non-volatile storage area, such as magnetic disk drives, optical disk drives, holographic disk drives, a tape drive, a virtual tape drive, etc.). The storage 416 may comprise an internal storage device or an attached or network accessible storage. Computer programs in storage 416 may be loaded into the memory elements 404 and executed by a processor 402 in a manner known in the art.

The computing system 400 may include fewer components than illustrated, additional components not illustrated herein, or some combination of the components illustrated and additional components. The computing system 400 may comprise any computing device known in the art, such as a mainframe, server, personal computer, workstation, laptop, handheld computer, telephony device, network appliance, virtualization device, storage controller, etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), digital versatile disk (DVD), Blu-Ray Disk (BD), an optical storage device including a holographic device, a magnetic storage device, a nanoprobe millipede device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the embodiments, the embodiments reside in the claims hereinafter appended or any subsequently-filed claims, and their equivalents.

What is claimed is:

1. A method comprising:
    determining a failure of at least one memory module of a solid state memory device, said solid state memory device having at least one memory module; and
    in response to said determination of a failure of at least one memory module of said solid state memory device, physically configuring at least a portion of said solid state memory device to be read-only.

2. The method of claim 1, wherein said determination of a failure comprises detecting a number of data access errors for each memory module of said solid state memory device and determining if a data access error threshold for at least one memory module has been reached.

3. The method of claim 2, further comprising in response to detecting a number of data access errors for at least one memory module of a solid state memory device, incrementing a data access error count for said at least one memory module.

4. The method of claim 1, wherein at least a portion of said solid state memory device comprises at least one memory module for which the said failure was determined.

5. The method of claim 1, wherein the at least a portion of said solid state memory device comprises the entire solid state memory device.

6. The method of claim 5, further comprising a reconstruction process, said reconstruction process comprises reconstructing data on said failed memory module, copying data from non-failed memory modules, replacing said solid state memory device with a new solid state memory device and storing reconstructed data and copied data on said new solid state drive device.

7. The method of claim 1, further comprising a reconstruction process, said reconstruction process comprises copying data from said failed memory module and storing said data to an alternative memory module of said solid state memory device.

8. The method of claim 1, further comprising a reconstruction process, said reconstruction process comprises copying data from a memory module containing a minor copy of data of said failed memory module and storing said mirror copy of data to an alternative memory module of said solid state memory device.

9. The method of claim 1, wherein said physically configuring at least a portion of said solid state memory device to be read-only comprises burning a fuse.

10. A method comprising:
    determining a failure of at least one memory module of a solid state memory device, said solid state memory device having at least one memory module;
    in response to said determination of a failure of at least one memory module of said solid state memory device, physically configuring at least a portion of said solid state memory device to be read-only; and
    performing a reconstruction process wherein said reconstruction process comprises reconstructing data on said failed memory module, replacing said failed memory module with a new memory module, storing reconstructed data on said new memory module, and configuring said solid state memory device to be read and write enabled.

11. A method comprising:
    detecting a number of data access errors for each memory module of a solid state memory device, the solid state memory device having at least one memory module;
    determining if a data access error threshold for at least one memory module has been reached;
    in response to determining said data access error threshold has been reached, physically configuring at least a portion of said solid state memory device to be read-only; and
    in response to physically configuring at least a portion of said solid state memory device to be read-only, performing a solid state memory device reconstruction process.

12. A memory system comprising:
    a solid state memory device; and
    a solid state drive controller coupled to said solid state memory device, said solid state drive controller configured to:
    determine a failure of at least one memory module of a solid state memory device, said solid state memory device having at least one memory module; and
    in response to said determination of a failure of at least one memory module of said solid state memory device, configure at least a portion of said solid state memory device to be read-only.

13. The memory system of claim 12, wherein said solid state drive controller is configured to perform said determination of a failure of at least one memory module of said solid state drive controller by detecting a number of data access errors for each memory module of said solid state memory device and determining if a error threshold for at least one memory module has been reached.

14. The memory system of claim 13, wherein said solid state drive controller further configured to increment a data access error count for said at least one memory module in response to detecting a number of data access errors for at least one memory module of a solid state memory device.

15. The memory system of claim 11, wherein at least a portion of said solid state memory device comprises at least one memory module for which the said failure was determined.

16. The memory system of claim 12, wherein at least a portion of said solid state memory device comprises the entire solid state memory device.

17. The memory system of claim 12, wherein said solid state drive controller is further configured to perform a reconstruction process, said reconstruction process comprising copying data from said failed memory module and storing said data to an alternative memory module of said solid state memory device.

18. The memory system claim 12, wherein said solid state drive controller is further configured to perform a reconstruction process, said reconstruction process comprising copying data from a memory module containing a mirror copy of data of said failed memory module and storing said mirror copy of data to an alternative memory module of said solid state memory device.

19. The memory system of claim 12, wherein said solid state drive controller is further configured to perform a reconstruction process, said reconstruction process comprising reconstructing data on said failed memory module, copying data from non-failed memory modules, replacing said solid state memory device with a new solid state memory device and storing reconstructed data and copied data on said new solid state drive device.

20. The memory system of claim 12, wherein said solid state drive controller is configured to configure said at least a portion of said solid state memory device by burning a fuse.

21. A memory system comprising:
a solid state memory device; and
a solid state drive controller coupled to said solid state memory device, said solid state drive controller configured to:
determine a failure of at least one memory module of a solid state memory device, said solid state memory device having at least one memory module;
in response to said determination of a failure of at least one memory module of said solid state memory device, configure at least a portion of said solid state memory device to be read-only; and
perform a reconstruction process, said reconstruction process comprising reconstructing data on said failed memory module, replacing said failed memory module with a new memory module, storing reconstructed data on said new memory module, and configuring said solid state drive device to be read and write enabled.

22. A memory system comprising:
a solid state memory device; and
a solid state drive controller coupled to said solid state memory device, said solid state drive controller configured to:
detect a number of data access errors for each memory module of a solid state memory device, the solid state memory device having at least one memory module;
determine if a data access error threshold for at least one memory module has been reached;
physically configure at least a portion of said solid state memory device to be read-only in response to said determining said data access error threshold has been reached; and
perform a solid state memory device reconstruction process in response to said configuration of at least a portion of said solid state memory device to be read-only.

* * * * *